Inventors
William E. Brill &
Emil R. Gasser
By Blackmore, Spencer & Hirt
Attorneys Patented May 20, 1947

2,420,856

UNITED STATES PATENT OFFICE 2,420,856

SHIP DRIVE AND CONTROL SYSTEM

William Elmer Brill, Cleveland, Ohio, and Emil R. Gasser, Buffalo, N. Y., assignors to General Motors Corporation, Detroit, Mich., a corporation of Delaware Application April 26, 1943, Serial No. 484,596

21 Claims. (Cl. 192—.01)

The present invention generally relates to ship propulsion control means and more particularly to combined reversing and speed controlling means therefor.

The principal object of the present invention is to provide a simple manually operable control system including a single manually operable control lever for normally controlling engine driven reversing means and engine speed varying means in a preselected sequence and to also provide separate manually operable emergency reversing control means.

The control system for accomplishing the above object and other novel features incorporated therein will become apparent by reference to the following detailed description and accompanying drawings illustrating a control system which is particularly adapted for controlling a Diesel engine and reverse gear driven thereby, which includes fluid pressure engaged means for causing ahead or astern drive.

Figures 1, 4:
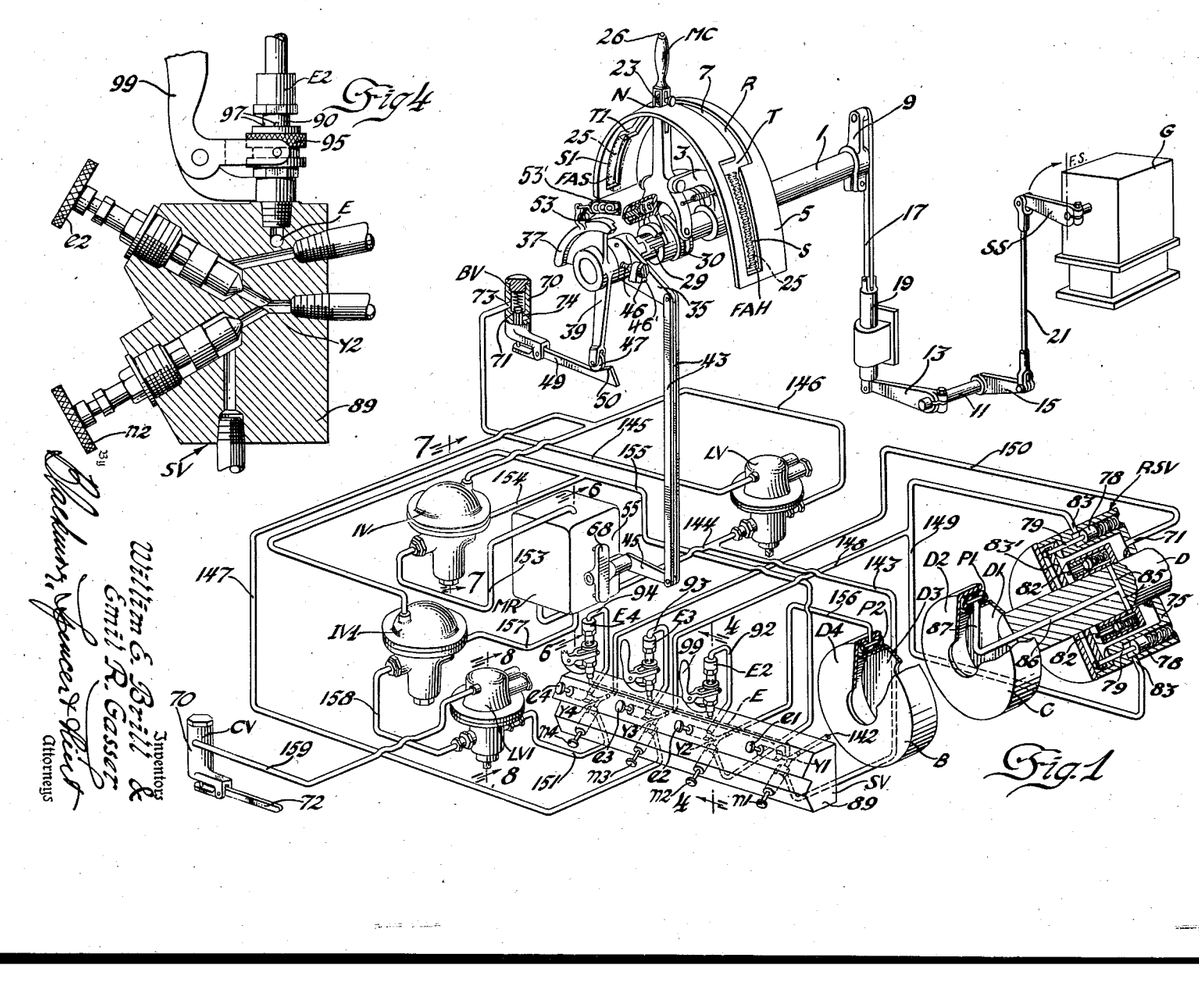
Fig. 1 is a diagrammatic perspective view of the complete control system.
Figs. 4, 6, 7 and 8 are enlarged sectional views taken on lines 4—4, 6—6, 7—7 and 8—8 of Fig. 1.

Referring to Figure 1, the control system generally comprises a master control lever MC which is movable from a neutral position to a plurality ahead or astern control positions for controlling valve means to insure the proper sequence of inflation and deflation of pressure actuated means causing ahead or astern drive in combination with the engine speed varying means and manually operable selector valve means SV to permit separate control of the pressure actuated means in an emergency.

The pressure actuated means for causing ahead or astern drive are of a well known type, shown generally at C and B, which are included in a marine reversing gear, not shown, of any well known planetary type which is driven from an engine shaft D.

In the arrangement illustrated, the means C is the ahead driving clutch and comprises a driving drum $D_1$ driven by the engine shaft D and a driven drum $D_2$. The drums $D_1$ and $D_2$ are shown provided with concentrically arranged annular friction surfaces and a flexible pneumatic tube $P_1$ of annular form is carried on the friction surface of the drum $D_1$ and is connected to a source of fluid pressure by means of an air seal RSV, of a well-known type to be described, which permits inflation or deflation of the clutch tube.

The means B is a brake to cause astern drive and comprises drums $D_3$ and $D_4$ which are also shown provided with concentrically arranged annular friction surfaces and a flexible pneumatic tube $P_2$ of annular form is located therebetween and carried on the annular surface of the drum $D_4$, which is stationary. The drum $D_3$ is normally driven by the planetary reaction member of the marine reversing gear, not shown, so that upon frictional engagement of the drums and tube, the reaction member is stopped to cause astern drive in a well known manner.

The speed controlling means is an engine governor G, of a well-known type, which is driven by the engine, not shown. The governor G, acts in response to variations in the speed thereof to regulate the fuel supplied thereto in a well-known manner in order to cause operation of the engine at substantially constant speed. The governor G is provided with conventional speed setting means, not shown, which is operable by a speed setting lever SS to vary the speed response of the governor in a well-known manner so that the engine is caused to operate at any one of a plurality of preselected constant values of speed which are directly proportional to the amount of movement of the speed setting lever SS, from the idle speed position, in which it is shown, to its full speed position FS.

Figure 2:
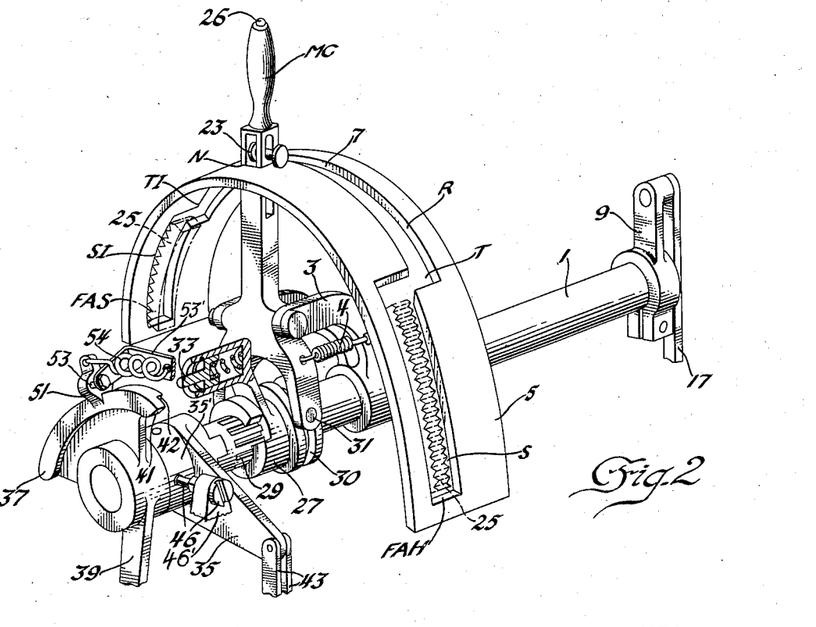
Figs. 2 and 3 are enlarged views of certain of the control elements shown in Fig. 1 to better illustrate the invention.

The master control lever MC, as best shown in Figure 2, is operably connected to a control shaft 1 to cause angular movement thereof for controlling the engine speed and to rock about an axis transverse to the control shaft for causing engagement of mechanical clutch means and angular movement thereof for controlling valve means for the clutch and brake means C and B. The control shaft 1 is supported in any convenient manner for rotation about its axis and a lever 3 is secured thereto upon which the master control lever MC is pivotally connected for rocking motion about an axis transverse to the axis of the shaft 1. Angular and rocking movement of the master control lever is limited by a stationary lever quadrant 5 which is provided with a slot, shown generally at 7, through which the upper portion of the lever extends. The master control lever MC is biased for counterclockwise rocking movement about its pivot on the lever 3 by a spring 4 connected between the lower portion of the master control lever MC and the lever 3. The upper end of the master control lever is manually movable to the right against the action of the spring 4 in a neutral transversely extending slot portion N into a longitudinally extending reversing portion R of the quadrant slot. The reversing slot portion permits limited angular movement of the control lever in either direction from the neutral slot portion for controlling inflation of either the ahead clutch C or astern brake B. Transversely extending quadrant slot portions T and T₁ permit limited transverse movement of the control lever into longitudinally extending slot portions S and S₁ to permit further angular movement of the control lever and control shaft 1 to the full speed ahead or astern control positions indicated at FAH and FAS at the extremities of the slot portions S and S₁ respectively.

As previously explained the increase in the engine speed is directly proportional to the extent of movement of the governor speed setting lever SS and mechanical speed setting linkage is provided between the control shaft 1 and the governor speed setting lever SS so that for a constant rate of angular movement of the control lever, in the slot portions S and S₁ of the quadrant toward the full speed controlling positions, causes an increasing rate of movement of the speed setting lever SS and therefore an increasing rate in the engine speed between idle and full speed valves. This speed control linkage comprises a lever 9 secured to the control shaft 1, a lay shaft 11 mounted for rotation about an axis parallel to the control shaft 1, on which levers 13 and 15 are secured, a link 17 and slide rod 19 connection between the levers 9 and 13 and a link 21 interconnecting the lever 15 with the governor speed setting lever SS. The lever 9 is secured on the shaft 1 in approximately the same plane as the lever 3 and control lever MC so that when the latter is in the neutral slot portion N, the lever 9 and link 17 are in substantially the same plane, or dead center relation. With this lever and link arrangement angular movement of the control lever MC in either direction in the reversing slot portion R causes only slight clockwise movement of the governor speed setting lever SS and therefore little change in the engine speed but when the control lever MC is moved angularly at a constant rate toward the full speed ahead or astern positions in the slot portions S and S₁ the governor speed setting lever is moved clockwise at an increasing angular rate toward its full speed position FS to cause an increasing rate of speed increase of the engine. The control lever MC is also provided with rotatable worm pawl 23 which engages teeth formed on quadrant sectors 25, shown in dotted lines, which are fixed centrally in the quadrant slot portions S and S₁ to retain the master control lever MC in any desired angular position therein. Rotation of the worm pawl 23 when engaged with the teeth of the sectors 25 provides convenient means for adjustment of the control lever and engine speed in small increments and a thumb button 26 in the end of the control lever is provided to cause disengagement of the pawl 23 from the teeth of the sectors 25.

Transverse rocking movement of the control lever clockwise in the transverse slot portions N, T and T₁ actuates a clutch member 27 which is slidably mounted on a splined portion 29, of the control shaft 1 and which is provided with an external annular groove 30 into which extend pins 31 carried by the bifurcated lower end portion of the control lever MC. The clutch member 27 is provided with axially extending teeth on the left face thereof and also supports a spring biased plunger 33 which is normally urged outwardly to the left and capable of moving inwardly to the right with respect to the clutch member about an axis parallel to the axis of the clutch member. Maximum rocking movement of the control lever MC from left to right in the transversely extending portions N, T and T₁ of the slot 7 in the quadrant causes the lower end of the control lever and clutch member 29 to be moved to the left on the splined portion 29 of the control shaft 1 to cause engagement of the teeth on the clutch member with teeth formed on the right face of the hub of a lever 35, which is rotatably mounted on the shaft 1 to the left of the clutch member, and to also cause the spring biased plunger 33 on the clutch member to be moved to the left either into contact with an upstanding sector shaped portion 37 of a lever 39, which is also rotatably mounted on the control shaft, or moved into the plane of either of the stepped radial surfaces 41 or 42 formed on the upstanding sector shaped portion 37 of the lever 39.

The lever 35 is operably connected by means of a link 43 with an operating lever 45 of a master reversing valve MR for moving it angularly in opposite direction from the central angular or neutral position, in which it is shown to ahead or astern controlling positions. The lever 35 is retained in any one of three angular positions, corresponding to neutral, ahead and astern control positions of the master reversing valve MR, by a spring biased detent 46 secured to a stationary arm 46' and engageable in three angularly spaced depressions in the hub 35' of the lever 35 to retain the lever in either of these three positions when moved thereto. The lever 35 is moved angularly from the central or neutral position to either of its other angular positions when engaged by the clutch member 27 and upon rotation thereof by movement of the control lever to either extremity of the reversing portion R of the quadrant slot 7.

The lever 39 supports a roller 47 for depressing an operating lever 49 of a clutch control bleed valve BV by contact with a cam portion 50 on the valve operating lever 49. The clutch control bleed valve BV, as will be subsequently described, controls deflation and disengagement of the ahead driving clutch C. The lever 39 is normally retained in the position shown, that is, with a boss 51 on the sector shaped lever portion 37 in contact with a stop member 53 secured to a stationary arm 53' by action of a tension spring 54 which is connected between the boss 51 and the stationary member 53'. With the lever 39 retained in the above described normal position, the roller 47 on the lever is adjacent the cam portion 50 of the bleed valve operating lever 49. When the master control lever MC is moved to the right in the neutral quadrant slot portion N, the spring biased plunger 33 will be moved into contact with the sector shaped portion 37 of the lever 39 adjacent the stepped radial faces 41 and 42 formed thereon and upon a slight clockwise rotation of the clutch 27 and plunger 33 from this position by slight clockwise movement of the control lever 37 in the reversing quadrant slot portion R from the neutral portion toward the full speed ahead position, the plunger 33 will be moved to the left into the plane of the radial face 42 of the lever. A slight further clockwise movement of the clutch 27 and plunger 33 allows it to move entirely off of the sector shaped portion 37 of the lever 39 and into the plane of the radial face 41 formed thereon. With the above arrangement of the lever 39 and plunger 33 it will be evident that only when the control lever MC is moved counterclockwise in the reversing quadrant slot portion toward the neutral slot portion will the plunger 33 be then brought into contact the radial surface 41 on the lever 39 to move it counterclockwise in order to depress the operating lever 49 of the bleed valve BV and should the control lever MC be moved clockwise only slightly in the reversing slot portion from the neutral portion and then back, the plunger 33 will then contact the radial face 42 on the lever 39 to move it counterclockwise a lesser amount. Clockwise movement of the control lever MC in the reversing slot portion R merely moves the plunger 33 off of the quadrant portion 37 of the lever 39 and only counterclockwise movement of the lever in this slot portion toward and beyond the neutral slot portion causes counterclockwise movement of the lever 39 and advanced or delayed operation of the bleed valve BV.

The above mentioned master reversing valve MR and clutch control bleed valve BV, which are operated by the master control lever MC, in combination with the engine speed controlling means G, are included in a pneumatic control system for controlling operation of either the ahead and astern driving means C and B. The pneumatic control system in addition to the above mentioned valves MR and BV, seal RSV and selector valve mechanism SV, also includes a manually operable valve CV for controlling the boosting of the pressure in the clutch tube P1 and pressure operated interlocking and control valves shown at IV and IV1 and LV and LV1 respectively.

Figures 6, 7, 8:
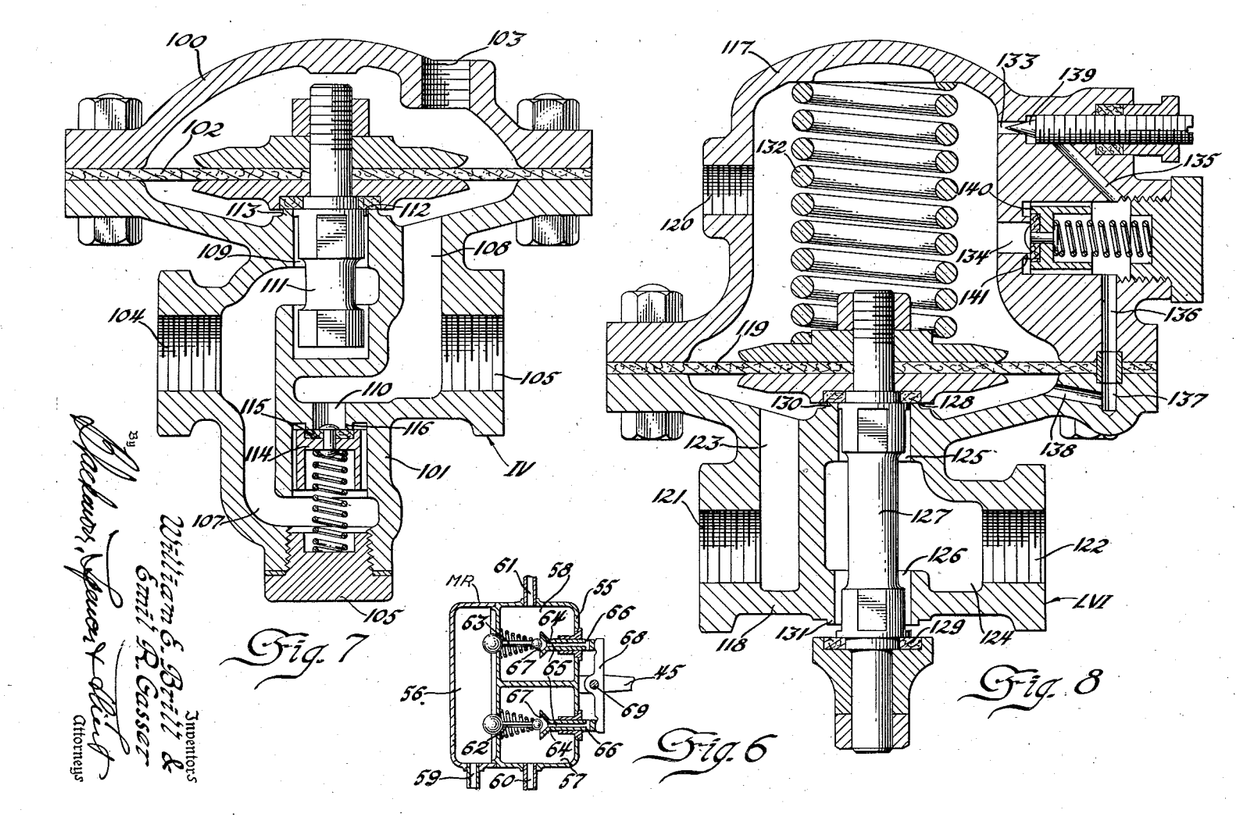

The master reversing valve MR, as best shown in Figure 6, comprises a hollow housing 55 provided with an inlet cavity 56 and two pressure outlet cavities 57 and 58 separated by partitions. A pressure inlet opening 59 is provided for the inlet cavity and pressure outlet openings 60 and 61 are provided for the outlet cavities. Two ball valve seats are provided in the partition separating the inlet cavity from the two outlet cavities, and ahead and astern dumb-bell valves 62 and 63 are spring biased on these seats. A pair of identical valve push rods 64 are provided and each extends outwardly through separate openings in each outlet cavity. Each push rod is provided with outlet cavity venting passages 65 and 66 and a venting seat 67 which is movable into seating relation with the small ball end of a respective dumb-bell valve to close off these venting passages and move the large ball end off of its seat to allow pressure from the inlet cavity to enter either outlet cavity of the master reversing valve. A walking beam lever 68 is secured to a shaft 69 which is rotatably mounted on the housing 55 for moving either push rod and a respective valve off its seat. The previously mentioned master reversing valve operating lever 45 is also secured to the shaft 69 to cause the ahead dumb-bell valve 62 to be unseated by clockwise movement of the operating lever 45 through the previously described linkage connection with the master control lever MC when this lever is moved clockwise in the reversing portion R of the quadrant slot away from the neutral slot portion N. Movement of the control lever in the opposite direction or counterclockwise in the reversing slot portion R away from the neutral slot portion N causes the astern valve 63 to be unseated.

The clutch control bleed valve, BV shown in Figure 1 with parts broken away, is identical with the manually operable clutch charging valve CV with exception of the operating lever. Each of these valves comprise a valve body 70 provided with a valve seat on which a poppet valve 71 is spring biased. The stem of the valve is shown projecting downward out of the body and is moved upward by the inner end of the valve operating lever, which is pivoted on the valve body 70, when the outer end of the lever is depressed. The operating lever 49 of the valve BV has been previously described and the operating lever of the valve CV is indicated at 72. An outlet port 73 is provided in the valve body above the valve and an atmospheric vent port 74 is provided in the valve body below the valve.

Figure 3:
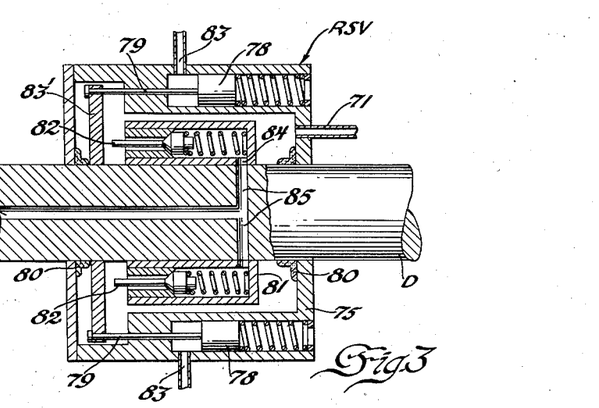

The seal RSV by which air is supplied to or exhausted from the rotary pneumatic tube P1 of the ahead driving clutch C, as best shown in Figure 3, comprises a stationary housing 75 which is provided with aligned horizontal openings, through which the engine shaft D extends, a pressure inlet opening 71 and horizontal bores in which pistons 73 and piston rods 79 are spring biased for movement to the left therein. The outer end of these bores are shown open to atmosphere. Sealing members 80 are secured to the inner end walls of the housing adjacent the shaft openings and are held in sealing contact with the shaft periphery by the pressure in the housing. A valve ring 81 is secured to the rotary engine shaft D within the stationary housing 75 and includes check valves 82 which are spring biased on seats secured in horizontal bores extending part way into the valve ring. The stems of the check valves 82 project outwardly of the bores, to the left, and a check valve actuating plate 83' is operably connected to the piston rods 79 to cause movement of the check valves to the right off of their seats. Pressure inlet openings 83 are provided in the piston bores to the left of the pistons for applying pressure thereon to cause movement of the pistons 78 and valve actuating plate 83' to the right for unseating the check valves 82. The interior of the housing 75 is connected to the pneumatic clutch tube P1 through the bores containing the check valves and passages 84 extending radially inward from these bores, to the right of the check valves, which register with radial passages 85 in the shaft D. The radial shaft passages extend into an axial shaft passage 86 which is connected by a pipe 87 to the interior of the ahead clutch tube P1.

Figure 5:
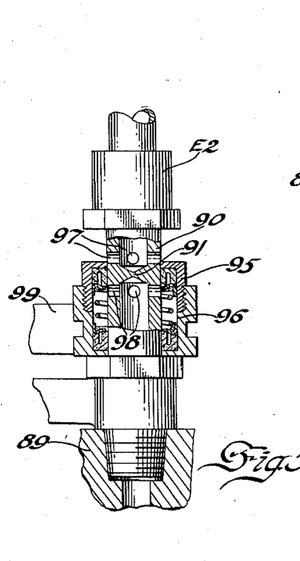
Fig. 5 is an enlarged view of the portion of Fig. 4 with parts broken away and in section to better illustrate the invention.

The selector valve mechanism SV comprises a housing 89 provided with four Y shaped passages Y1, Y2, Y3 and Y4 extending transversely through the body, as best shown in Figures 1 and 4, with one leg of each Y-shaped passage extending horizontally to the rear face of the body and the other two legs extending angularly to the front face. A needle valve is included in each forwardly extending leg of these passages and a branch passage also extends outwardly from each of the forwardly extending legs, as best shown in Figure 4, so that when the needle valves are closed the branch passages are closed off from the forwardly extending legs of the Y shaped passages. The upper branch passage leading from the upper forwardly extending leg of the passage Y1 extends upwardly to a longitudinally extending closed emergency pressure supply passage E to which the emergency operating valves $E_2$, $E_3$ and $E_4$ are connected and all the other upper and lower branch passages extend respectively to the rear and lower faces of the valve housing 89. The needle valves in the upper legs of the Y passages, indicated at $e_1$, $e_2$, $e_3$ and $e_4$, are emergency valves which are normally closed except to permit separate control of the clutch and brake by the emergency valves $E_2$, $E_3$ and $E_4$. The needle valves $n_1$, $n_2$, $n_3$ and $n_4$ in the lower forwardly extending legs of the Y passages are normally opened to permit normal control of the clutch and brake by the master reversing valve MR and valve BV, which are operated by the master control lever, and when the needle valves $n_1$ to $n_4$ are closed and the emergency needle valves $e_1$, to $e_4$ are opened separate control of the clutch and brake is accomplished by the emergency valves $E_2$, $E_3$ and $E_4$. The emergency valves $E_2$, $E_3$ and $E_4$ are identical and the structural details thereof are best shown in Figures 4 and 5. Each of these valves include a hollow cylindrical body 90 provided with a thin diametrical partition 91 which divides the body into a lower inlet portion and an upper outlet portion. The lower inlet portion of these valves are connected to the emergency pressure passage E and the upper portions of the valves $E_2$, $E_3$ and $E_4$ are connected respectively by pipes 92, 93 and 94 to the upper branch passages leading to the respective upper forwardly extending legs of the passages $Y_2$, $Y_3$ and $Y_4$. A valve sleeve 95 is slidably mounted on each valve body 90 and is provided with an internal annular groove or port 96 of sufficient length to connect the upper row of atmospheric ports 97 located adjacent the upper edge of the valve partition 91 with the lower row of pressure inlet ports 98 located adjacent the lower edge of the partition when the valve sleeve 95 is moved upward from the normal position in which it is shown where only the lower inlet ports 98 are covered by the sleeve and the upper ports are uncovered to atmosphere. A valve sleeve operating handle 99 is pivoted on a projection of the body and is provided with pins projecting into an external groove in the valve sleeve to move it upward to a position so that both rows of ports are connected by depression of the operating handle.

The pressure operated valves IV and IVI serve as brake and clutch interlocking means and are of identical construction, the details of which are best shown in Figure 7. Each of these valves generally comprise an upper hollow dome portion 100, a lower body portion 101 and a flexible circular diaphragm 102 clamped therebetween. The dome is provided with a vent opening 103 and the body is provided with an inlet opening 104 and an outlet opening 105 extending respectively into inlet and outlet cavities 107 and 108. The outlet cavity 108 extends upwardly to the lower surface of the diaphragm. The inlet and outlet cavities are connected by an upper port 109 and a lower exhaust port 110. A valve stem 111 having a seat 112 is clamped to the diaphragm so that it is normally held by gravity on the upper seat portion 113 of the upper port 109 to close this port and an exhaust valve 114 having a seat 115 is spring biased upwardly so that it is normally retained on the lower seat portion 116 of the lower exhaust port 110 to close this port.

The pressure operated valves LV and LVI are identical and the details thereof are best shown in Figure 8. Each of these valves generally comprise an upper hollow dome portion 117, a lower body portion 118 and a circular flexible diaphragm 119 clamped therebetween. The dome is provided with a vent opening 120 and the body is provided with an inlet opening 121 and an outlet opening 122 extending respectively into inlet and outlet cavities 123 and 124. The inlet cavity 123 extends upwardly to the lower surface of the diaphragm and upper and lower ports 125 and 126 located in the body coaxial with the diaphragm. The upper port 125 is located between the inlet and outlet cavities and the lower or atmospheric port 126 connects the outlet cavity to atmosphere. A valve stem 127 provided with an upper seat 128 and a lower seat 129 is clamped to the diaphragm and extends downwardly through the ports 125 and 126 so that the upper seat 128 of the valve stem is held on the upper seat portion 130 of the upper port 125 to close this port and the lower seat 129 on the stem is held off of the lower seat portion 131 of the lower atmospheric vent port 126 by a compression spring 132 located in the dome and exerting downward force on the diaphragm. The space in the dome 117 above the diaphragm 119 is connected to the inlet cavity 123 of the body by ports 133 and 134 in the dome extending into registering dome passages 135 and 136 which register with body passages 137 and 138 extending into the inlet cavity. An adjustable needle valve 139 is shown extending into the port 133 to regulate the air flow therethrough and a check valve 140 is spring biased on the seat portion 141 of the port 134 to allow one way flow of air only from the dome to the outlet cavity.

With the manual control lever in the neutral slot portion N to cause operation of the engine at idling speed and with the various valves in their normal position, as shown, and the emergency needle valves $e_1$, $e_2$, $e_3$ and $e_4$ closed and needle valves $n_1$, $n_2$, $n_3$ and $n_4$ open, the pipe connections and sequence of operation of the combined control system will now be described.

A pressure supply pipe 142 is connected to the rearwardly extending horizontal leg of the passage $Y_1$ in the selector valve and air will accordingly pass through the lower forwardly extending leg and branch passage leading therefrom and pipes 143 and 144 connected between this branch passage and the respective inlet openings 59 and 121 of the master reversing valve MR and pressure operated valve LV. The air pressure in the inlet cavity 123 of the valve LV will move the diaphragm 119 upward against the force of the spring 132 and air trapped in the dome, as the vent opening in the dome is connected by a pipe 145 to the outlet port 73 of the normally closed valve BV. Upward movement of the diaphragm and valve stem 127 opens the inlet port 125 and closes the atmospheric port 126 of the valve LV to permit air to flow from the outlet cavity 124 and opening 122 through pipes 146 and 147 to the vent opening 103 of the pressure operated interlocking valve IV and the lower branch passage extending upwardly into the lower forwardly extending leg of the passage $Y_3$ in the selector valve. The air pressure acting on the upper side of the diaphragm 102 of the valve IV retains the pressure inlet port 109 closed so that this valve acts to prevent inflation of the brake tube $P_2$ causing astern drive in a manner which will be described. The valve IV will therefore be referred to as the brake interlocking valve. The horizontal rearwardly extending leg of the passage $Y_3$ in the selector valve SV is connected by pipes 148 and 149 to the pressure inlet openings 83 in the stationary seal housing 75 and air pressure entering therethrough causes the pistons 78 to move the check valve actuating plate 83' to the right and unseat the check valves 82 in the rotary valve ring 81. The pressure inlet opening 71 in the stationary seal housing 75 is then connected to atmosphere by pipes 150 and 151. The pipe 150 is connected between the inlet opening 71 in the housing and the horizontal rearwardly extending leg of the passage $Y_4$ and the pipe 151 is connected between the lower branch passage which is connected to the lower forwardly extending leg of the passage $Y_4$, and the outlet opening 122 and cavity 124 of the other pressure operated valve LVI which is open to atmosphere through the open atmospheric port 126 thereof. The interior of the valve seal stationary housing 75 and the clutch tube $P_1$ connected thereto through the previously described passages in the shaft D, valve ring 75 and open check valves 82, are accordingly vented to atmosphere.

When the pressure entering the dome of the valve LV through the port 133, provided with the adjustable needle valve 139, and connecting passages 135, 136, 137 and 138 to the valve inlet cavity 123 and the pressure of the spring 132 on the upper face of the diaphragm 119 balances that of the supply pressure in the inlet and outlet cavities the diaphragm and valve stem will then move down and close off the inlet port 125 and open the atmospheric port 126. This vents the outlet cavity and pipes 146 and 147 and therefore vents the dome of the brake interlocking valve IV and space to the left of the spring biased pistons 78 in the seal RSV which causes the check valves 82 to close. The pressure in the inlet cavity of the master reversing valve MR will now be equal to that of the supply pressure.

*Neutral to full speed astern operation*

When the upper end of the master control lever MC is moved transversely to the right in the neutral portion N of the quadrant slot to the reversing slot portion R the clutch member 27 will engage the lever 35 connected to the master reversing valve and the spring plunger 33 will engage the sector portion 37 of the lever 39 adjacent the radial faces 41 and 42 thereon. Counterclockwise movement of the control lever in the reversing slot portion from the neutral position as has been previously described causes a corresponding movement of the control shaft 1 and clutch member 27, which movement initially causes only a slight increase in the engine speed, and counterclockwise movement of the lever 35 and linkage connecting it to the astern valve 63 in the master reversing valve MR causing this valve to be unseated. The spring plunger 33 on the clutch 27 moves relative to the sector portion 37 of the lever 39 for this counterclockwise movement of the control lever. When the astern valve 63 is unseated air passes from the master valve inlet cavity 56 to the outlet cavity 58 and flows through the outlet opening 61 and pipe 153 connecting this opening to the inlet opening 104 and cavity 107 of the brake interlocking valve IV. As previously described, the dome of this valve is now vented to atmosphere and the pressure in the inlet cavity 107 will move the diaphragm 102 and inlet valve 112 upward and allow air to pass outwardly through the outlet cavity 108 and opening 105 and connecting pipes 154, 155 and 156 to the tube $P_2$ of the brake B and dome of the interlocking valve IVI which serves as the clutch interlocking valve. The pipe 154 is connected between the outlet opening 105 of the valve IV and pipe 155, one end of which is connected to the dome of the clutch interlocking valve IVI and the other end is connected to the lower branch passage and lower forwardly extending leg passage of the selector valve passage $Y_2$ which are opened by the needle valve $n_2$ to the rearwardly extending leg passage which is connected by a pipe 156 to the tube $P_2$ of the brake B. Inflation of the tube $P_2$ of the brake, as has been described, causes application of the brake B to establish astern drive.

When the master control lever MC is moved to the left through the transversely extending slot portion $T_1$ the clutch 27 moves to the right out of engagement with the lever 35 and the spring detent means 46 enters one of the depressions in the hub 35' of the lever 35 to retain it in this position. Further counterclockwise movement of the control lever at a constant rate in the speed portion $S_1$ of the quadrant slot thereafter only causes an increasing rate of movement of the governor speed setting lever SS and a corresponding rate of speed increase of the engine.

*Full speed astern to neutral operation*

Movement of the control lever clockwise in the slot portion $S_1$ causes a decreasing rate of speed decrease of the engine substantially to the idle value and successive movement of the control lever to the right in the slot portion $T_1$ and clockwise in the reversing slot portion R causes the clutch 27 to engage the lever 35 and move it clockwise to cause seating of the astern valve 63 in the master reversing valve MR. When the astern valve seats the venting seat 67 and passages 65 and 66 of the astern valve push rod 64 are opened to vent to atmosphere the valve outlet cavity 58 and pipe 153 connected thereto. Venting of the pipe 153 which is connected to the inlet cavity 107 of the brake interlocking valve IV permits the higher pressure in the outlet cavity 108 to unseat the exhaust valve 114 to cause venting of pipes 154 and 155 connecting the vent opening 103 in the dome of the clutch interlocking valve IVI and tube $P_2$ of the brake B. Venting of the brake tube $P_2$ causes release of the brake and therefore discontinuation of astern drive.

*Neutral to full speed ahead operation*

Movement of the control lever MC clockwise from the neutral position in the reversing slot portion R causes clockwise movement of the control shaft 1, clutch 27 and lever 35 which causes a slight increase in the engine speed and the opening of the ahead valve 62 of the master reversing valve MR and movement of the plunger 33 on the clutch off of the sector shaped portion 37 of the lever 39. Unseating of the ahead valve 62 permits air to pass through the outlet cavity 57 and opening 60 in the master reversing valve MR and through a pipe 157 connected between this outlet opening 60 and the inlet opening 104 and cavity 107 of the clutch interlocking valve IVI. The pressure in the inlet cavity of the valve IVI causes the diaphragm and inlet valve to move upwardly and open the inlet port 109, providing however the pressure in the dome thereof and tube $P_2$ of the brake B has been reduced to atmosphere, in the above described manner. Air then enters the outlet cavity 108 of the valve IVI and passes outwardly through the outlet opening 105 and pipe 158 which is connected between this opening and the inlet opening 123 of the pressure operated valve LV1. Pressure entering the inlet cavity of the valve LV1 through the inlet opening 121 moves the valve diaphragm 119 and valve stem 127 upward to open the upper inlet port 125 and close the lower or atmospheric port 126 and air pressure then enters the outlet cavity 124 and passes outwardly through the outlet opening 122 and pipe 151 connecting this opening with the lower branch passage and lower forwardly extending leg of the passage $Y_4$ of the selector valve SV and through the pipe 150 which is connected between the horizontal rearwardly extending leg of the passage $Y_4$ and the inlet opening 71 of the seal RSV to charge the seal and inflate the tube $P_1$ of the clutch C by the automatic unseating of the check valves 82 in the rotary valve ring 81 on the engine shaft D. The air enters the tube $P_1$ through the registering passages in the ring 81 and engine shaft D which are connected to the tube by the pipe 87 as has been previously explained. Inflation of the tube $P_1$ of the clutch C causes engagement thereof to establish low speed ahead drive. To obtain full-speed ahead drive the control lever MC is successively moved transversely to the left through the transverse quadrant slot portion T and clockwise in the speed controlling portion S of the quadrant slot to the full speed ahead position FAH. When the control lever MC is moved to the left in the slot portion T the clutch 27 is moved out of engagement with the lever 35 and it is held in the position to which it was moved by the detent means 46 entering a depression in the hub 35' of the lever 35 to hold open the head valve 62 of the master reversing valve MR. The opening of the inlet port 125 of the valve LV1 allows air to enter the dome at a rate determined by the setting of the needle valve 139 in the port 133 in the dome in the same manner as set forth above in describing the operation of the identical valve LV. The opening in the dome of the valve LV1 is connected to the outlet opening of the normally closed valve CV by a pipe 159 to allow the pressure in the dome to oppose upward movement of the diaphragm. When the tube $P_1$ of the clutch is inflated to a pressure equal to the supply pressure the check valves 82 will seat automatically and the pressure on both sides of the diaphragm of the valve LV1 is equalized and the valve spring 132 will accordingly move the diaphragm and valve stem downward to cause closure of the upper vale port and the opening of the lower atmospheric port to vent the stationary seal housing RSV through this port and pipes 150 and 151 connected thereto. This automatic venting of the seal relieves the pressure on the shaft sealing members 80 and accordingly reduces the wear thereon. If the pressure confined in the clutch tube $P_1$ decreases due to leakage it may be increased by manual depression of the lever 72 of the clutch charging valve CV which vents the dome of the valve LV1 to atmosphere. This causes the inlet port of the valve LV1 to be automatically opened and its atmospheric port to be automatically closed for a time sufficient to restore the pressure in the clutch tube to a value equal to the supply pressure which then causes closure of the inlet port and opening of the atmospheric port to vent the seal in the manner previously described. The construction of clutch charging control valve CV, which as previously explained, is identical to that of the bleed valve BV with exception of the operating handle. The pressure port 73 of the valve CV is shown connected by a pipe 159 to the vent opening 120 in the dome of the valve LV1 so that upon depression of the handle 72 of the valve CV the poppet valve 71 therein will be unseated to connect the pressure port 73 to the atmospheric vent port 74 to cause venting of the dome of the valve LV1 which causes it to repeat its cycle of operation automatically, in the above described manner.

*Full speed ahead to full speed astern operation*

Movement of the control lever MC counterclockwise in the slot portion S of the quadrant slot causes a prompt reduction in the engine speed to substantially the idle value. Transverse movement of the control lever to the right in the quadrant slot portion T from the slot portion S to the portion R causes engagement of the clutch 27 with the lever 35 and the plunger 33 on the clutch to be moved into the plane of the radial face 41 on the lever 39. Initial counterclockwise movement of the control lever in the quadrant slot portion R toward the neutral slot portion N causes the ahead valve 62 in the master reversing valve to be moved toward its seat, but slightly before it is seated by movement of the control lever to the neutral position in the slot portion R, the plunger 33 on the clutch contacts the radial face 41 on the lever 39 and moves it counterclockwise so that the roller 47 thereon contacts the cam portion 50 of the operating lever 49 to depress it and open the bleed valve BV to vent the pipe 145 and dome of the valve LV to atmosphere. With the dome of the valve LV vented the pressure in the inlet cavity of the valve causes upward movement of its diaphragm and valve stem and opening of the inlet port and closure of the atmospheric port so that air pressure is applied to the dome of the brake interlocking valve IV and pistons 78 in the seal RSV through pipes 146, 147, 148 and 149. The pressure on the dome of the brake interlocking valve IV prevents it from opening to charge the tube $P_2$ of the brake and the pressure on the pistons 78 in the seal RSV causes them to move the valve plate 83' and unseat the check valves 82 in the rotary ring 81 so that the clutch tube $P_1$ is promptly vented to atmosphere through the then open atmospheric port 126 of the valve LV1. This causes prompt deflation of the tube $P_1$ and disengagement of the ahead driving clutch C.

When the control lever MC is moved to the neutral portion of the reversing slot portion the ahead valve 62 of the master reversing valve MR is seated to shut off the pressure supplied to the inlet and outlet openings of the clutch interlocking valve IV1 through the pipes 157 and 158 and to vent these pipes to atmosphere through the venting seat and passages in the push rod 66 of the ahead valve 62. The exhaust valve 114 of the clutch interlocking valve will accordingly be opened and allow the pressure in the inlet and outlet cavities of this valve to be reduced to atmosphere and then the exhaust valve 114 and inlet port of the valve will close automatically.

Movement of the control lever MC counterclockwise slightly beyond the neutral portion of the reversing slot portion R causes the astern valve 63 of the master reversing valve to be opened and also causes full depression of the operating lever 49 of the bleed valve BV. The opening of the astern valve 63 allows pressure to enter the inlet port 104 and inlet cavity 107 of the brake interlock valve IV through the pipe 153 but as pressure is applied to the dome of this valve through the open inlet port 125 of the valve LV and pipe 146 as the dome of this valve is open to atmosphere through the open bleed valve BV, the pressure in the dome of the brake interlock valve IV prevents opening of the inlet port thereof and thereby prevents inflation of the brake tube $P_2$ and engagement of the brake. Upon a slight further counterclockwise movement of the control lever MC the roller 47 on the lever 39 is moved off of the cam 50 of the bleed valve lever 49 which causes closure of the clutch bleed valve BV. This permits gradual equalization of the air pressure on opposite sides of the diaphragm of the valve LV through the needle valve orifice 133 in the dome of this valve thereby causing closure of the inlet port 125 and opening of the exhaust port 126 of the valve LV. The opening of the exhaust port 126 of the valve LV reduces the pressure in the dome of the brake interlock valve IV and on the pistons 78 in the seal RSV to atmosphere. This allows air pressure to enter the brake tube $P_2$ through the inlet port 109 of the brake interlock valve IV and cause initial engagement of the brake B and thereby establishes astern drive and also causes the pistons 78 to be moved by their springs to cause movement of the rotary check valve ring 83' out of contact with the check valves 82 and they are returned to their seats by the check valve springs after venting of the clutch tube $P_1$ in the above described manner.

When the control lever MC is then moved successively counterclockwise in the reversing slot R to the transverse slot portion $T_1$ and to the left therein to the slot portion $S_1$ the clutch 27 is disengaged from the lever 35 and the plunger 33 on the clutch is disengaged from the radial face 41 of the lever 39. The lever 35 is retained in the position to which it was moved by the detent 46 entering a depression in the hub 35' of the lever and the lever 39 is moved clockwise by the spring 54 into engagement with the stop member 53 on the stationary member 53'. This return movement of the lever 39 causes it to contact the cam 50 on the clutch bleed valve lever 49 momentarily, which causes momentary opening of the bleed valve BV. This momentary opening of the bleed valve BV, however, does not cause operation of the valve LV in the manner described above. The brake B therefore is engaged fully by the pressure applied to the tube $P_2$ and slow speed astern drive is established. Further counterclockwise movement of the control lever in the quadrant slot portion $S_1$ causes an increase in speed of the engine to full speed.

The radial face 42 is provided on the sector portion 37 of the lever 39 for contact by the plunger 33 when the control lever is inadvertently moved clockwise a slight distance in the quadrant slot portion R from the neutral portion N, instead of counterclockwise toward the full speed astern position. This inadvertent movement causes the plunger 33 to be moved into the plane of the face 42 of the lever 39 so that upon subsequent counterclockwise movement of the control lever MC to the full speed astern position, the plunger 33 will engage the face 42 of the lever 39 and cause counterclockwise movement thereof and operation of the clutch bleed valve BV. It will be evident, however, that as the face 42, of the lever 39 will be contacted by the plunger 33 later than when the plunger contacted the face 41 of the lever 39, as has been previously described. This delay in operation of the clutch bleed valve BV causes delayed operation of the valve LV and brake interlock valve IV and is sufficient to cause proper deflation and disengagement of the clutch before engagement of the brake can occur for this inadvertent movement of the control lever MC.

*Emergency operation*

In order to control the clutch and brake separately or in combination, it is necessary that the needle valves $n_1$ to $n_4$ be closed and the emergency needle valves $e_1$ to $e_4$ be opened. This causes pressure application to the emergency clutch and brake control valves $E_2$ to $E_4$ from the emergency passage E in the selector valve SV.

*Emergency clutch operation*

Depression of the handle of the valve $E_4$ causes pressure to be applied to the pipe 94, upper branch passage and upper forwardly extending leg and rearwardly extending leg of the selector valve passage $Y_4$ and pipe 150 to cause application of pressure to the clutch seal RSV. The pressure in the seal forces the check valves 82 off their seats and allows pressure to enter the clutch tire $P_1$ through the passages 85 and 86 in the driving shaft D and pipe 87 to cause engagement of the clutch C and ahead drive. The check valves 82 close automatically when the pressure in the clutch tire $P_1$ and seal RSV is equalized and the handle of the valve $E_4$ may then be released to cause release of pressure in the clutch seal through the above described pipe connections between the seal and valve $E_4$ and exhaust openings 97 in the valve $E_4$. This prevents wear on the sealing members 89 of the seal.

*Emergency clutch disengagement*

Depression of the handle of the valve $E_3$ causes air pressure to be applied to the pistons 78 in the clutch seal RSV through the pipe 93, upper branch passage and upper forwardly extending leg and rearwardly extending leg of the selector valve passage $Y_3$ and pipes 148 and 149. This causes the pistons 78 to move the check valves 82 off their seats to permit release of pressure from the clutch tire through the exhaust openings 97 in the valve $E_4$.

*Emergency brake operation*

Depression of the handle of the valve $E_2$ causes pressure to be applied to the brake tire $P_2$ through pipe 92, upper branch passage and upper forwardly extending leg and rearwardly extending leg of the selector valve passage $Y_2$ and pipe 156. This causes application of the brake B and establishes astern drive. Release of the handle of the valve $E_2$ causes release of pressure in the brake tire through the above described connections and exhaust openings 97 of the valve $E_2$ thereby causing release of the brake. It will, therefore, be evident that depression of the handle 99 of any of the emergency valves $E_2$ to $E_4$ moves the valve sleeve port 96 into register with the pressure and vent ports 97 and 98 in the valve housing to cause pressure to be applied to respective means controlled thereby and this means is vented upon release of the handle which allows the valve sleeve port 99 to move over and close off the inlet ports 98 and open the vent ports 97 to release the pressure on the means controlled by each valve. It will be apparent from the above that if the handles of the emergency valves $E_2$ and $E_4$ are depressed simultaneously the brake tube $P_2$ and the clutch tube $P_1$ will be simultaneously inflated to lock the reverse gear so that no rotation of the gear elements or engine can occur and repairs can be more readily performed thereon. This locking feature is particularly desirable where a plurality of engine and reverse gears are employed for individually driving separate propeller shafts of a ship as the individual shafts, gears and engines may be rotated by movement of the ship through the water upon shutdown of any engine, so it is necessary to prevent rotation of any shutdown engine and its reversing gear to make repairs thereon.

We claim:

1. A control system for a reversing gear of the type described having separate pressure operable means for causing reversal thereof, said control means comprising pressure control valves for said pressure operated means, separate operating linkage for each of said valves, a master control lever movable in opposite directions between a neutral position and reversing control positions for engaging and moving one of said control valve linkages to cause operation of one or the other of said pressure operated means and a spring biased plunger operable by said control lever for operably engaging spaced portions of another of said valve linkages only when said lever is moved in one direction past the neutral position to cause advanced or delayed operation of another of said control valves thereby to vary the interval between operation of said separate pressure operable means.

2. A control system for a marine engine and reversing gear of the type described having engine speed controlling means, stationary pressure operated means for causing astern drive, rotary pressure operated means for causing ahead drive and pressure sealing means for said rotary means including pressure retaining check valves, and pressure operated check valve opening means, said control system comprising a plurality of controlling valves for said pressure operated means, separate operating linkages for certain of said valves, means operatively engageable with said valve linkage, other of said valves being operable by variations in pressure to control sequential operation of said pressure operated means to obtain either forward or reverse drive and to vent said sealing means, a manually operable master control lever operatively connected to said engine speed controlling means and said means engageable with said valve operating linkages, and a lever quadrant provided with a slot having central transversely and longitudinally extending portions and transversely and longitudinally extending slot portions either side of the central slot portions to permit joint control of said valves and engine speed controlling means when said lever is moved in the central longitudinal slot portion to obtain slow speed ahead or astern operation and to permit further movement of said speed controlling means when said lever is moved in either of said other longitudinal slot portions to obtain higher speed ahead or astern operation.

3. A control system for a reversing gear of the type described having stationary and rotary pressure operated means for causing drive in either direction, sealing and venting means for said rotary means including; pressure engaged friction sealing means, pressure retaining check valves and pressure operated check valve opening means, said control system comprising a plurality of pressure controlling valves for said pressure operated means, certain of said valves being of the automatic pressure responsive type for permitting pressure to be applied to and vented from either said stationary or rotary pressure operated means and to release the pressure on said pressure engaged friction sealing means to prevent wear thereon when said rotary means is operating and other of said valves being mechanically operated, a master controller movable between a neutral control position and reversing control positions for engaging and operating said mechanically operated control valves in sequence and in combination to vary the pressure on said pressure responsive valves to cause the above described operation thereof and a manually operable control valve for varying the pressure on one of said pressure responsive valves to cause pressure to be automatically applied to said rotary pressure operated means through said sealing means and the subsequent venting of said sealing means.

4. A control system for an engine and reverse gear of the type described having engine speed varying means and separate pressure operated means for causing drive in either direction, said control system comprising a plurality of control valves for said pressure operated means, a manually operable master control lever for controlling said engine speed varying means and certain of said valves to cause variable speed drive in either direction and to permit operation of the engine at idling speed without causing drive, other of said valves being manually operable emergency valves to control said pressure operated means separately or in combination to permit drive in either direction or to prevent rotation of said engine and reverse gear and still other of said valves being selector valves to permit control of said pressure operated means by said emergency valves or by said valves controlled by said master control lever.

5. A control system for a marine engine and reversing gear having engine speed control means, pressure operated braking means for causing astern drive, pressure operated clutching means for causing ahead drive and pressure sealing means for said clutching means including pressure operated friction sealing members, pressure retaining check valves and pressure operated check valve opening means, said control system comprising a pair of interlocking valves of the diaphragm type for said clutching and braking means, a pair of diaphragm valves for automatically controlling inflating and venting the clutching means and sealing means therefor, a master valve for controlling the pressure supplied to said clutching and braking means through said diaphragm valves, a pressure venting valve for controlling the pressure in one of said inflating and venting valves to cause venting of said clutch by action of both of said inflation and venting valves, a second manually operable venting valve for controlling the pressure on one of said inflation and venting valves to increase the pressure on said clutching means and a single manually operable control lever for operating said engine speed varying means, said master valve and one of said venting valves to cause low or variable speed ahead or astern drive and venting of said sealing means for said clutching means upon operation thereof.

6. A control system for a reversing gear having a fluid pressure operated clutch for causing forward drive, a fluid pressure operated brake for causing reverse drive, a rotary pressure seal associated with said clutch, check valves within said seal, said check valves adapted to open in response to fluid pressure in said seal to admit pressure to said clutch, fluid pressure operated means to open said check valves and permit flow of fluid from said clutch to said seal, a source of fluid pressure, conduit means for connecting said source to said brake, to said seal and to said check valve opening means, valve means included in said conduit means to admit pressure fluid to said check valve opening means and to release pressure from said seal and thereafter to admit pressure to the brake and to also relieve pressure from said brake, to relieve pressure from said check valve opening means and thereafter supply pressure to said clutch by way of said seal and check valves, and manually operable means to control said valve means.

7. A control system for a reversing gear having a fluid pressure operated clutch for causing forward drive, a fluid pressure operated brake for causing reverse drive, a rotary pressure seal associated with said clutch, check valves within said seal, said check valves adapted to open in response to fluid pressure in said seal to admit pressure to said clutch, fluid pressure operated means to open said check valves and permit flow of fluid from said clutch to said seal, a source of fluid pressure, conduit means for connecting said source to said brake, said seal and to said check valve opening means, valve means included in said conduit means to admit pressure fluid to said check valve opening means and to release pressure from said seal and thereafter to admit pressure to the brake and to also relieve pressure from said brake, to relieve pressure from said check valve opening means and thereafter supply pressure to said clutch by way of said seal and check valves, said valve means including control valves, operating linkage for said control valves and a master control lever movable between neutral and forward and reverse driving controlling positions for operating said control valve linkage.

8. A control system for a reversing gear having a fluid pressure operated clutch for causing forward drive, a fluid pressure operated brake for causing reverse drive, a rotary pressure seal associated with said clutch, check valves within said seal, said check valves adapted to open in response to fluid pressure in said seal to admit pressure to said clutch, fluid pressure operated means to open said check valves and permit flow of fluid from said clutch to said seal, a source of fluid pressure, conduit means for connecting said source to said brake, said seal and to said check valve opening means, valve means included in said conduit means to admit pressure fluid to said check valve opening means and to release pressure from said seal and thereafter to admit pressure to the brake and to also relieve pressure from said brake, to relieve pressure from said check valve opening means and thereafter supply pressure to said clutch by way of said seal and check valves, said valve means including control valves, operating linkage for said control valves, a master control lever movable between neutral and forward and reverse driving controlling positions for operating said linkage to control release of pressure from said brake and application of pressure to said clutch and to control release of pressure from said clutch and application of pressure to said brake.

9. A control system for a reversing gear having a fluid pressure operated clutch for causing forward drive, a fluid pressure operated brake for causing reverse drive, a rotary pressure seal associated with said clutch, check valves within said seal, said check valves adapted to open in response to fluid pressure in said seal to admit pressure to said clutch, fluid pressure operated means to open said check valves and permit flow of fluid from said clutch to said seal, a source of fluid pressure, conduit means for connecting said source to said brake, said seal and to said check valve opening means, valve means included in said conduit means to admit pressure fluid to said check valve opening means and to release pressure from said seal and thereafter to admit pressure to the brake and to also relieve pressure from said brake, to relieve pressure from said check valve opening means and thereafter supply pressure to said clutch by way of said seal and check valves, said valve means including control valves, operating linkage for said control valves, a master control lever movable between neutral and forward and reverse drive controlling positions for operating said linkage to control release of pressure from said brake and application of pressure to said clutch and to control release of pressure from said clutch and application of pressure to said brake, said valve means also including a clutch interlock pressure valve operable to permit pressure application to said clutch upon relief of pressure from said brake and a brake interlock pressure valve operable to permit pressure application to said brake upon relief of pressure from said clutch.

10. A control system for a reversing gear having a fluid pressure operated clutch for causing forward drive, a fluid pressure operated brake for causing reverse drive, a rotary pressure seal associated with said clutch, check valves within said seal, said check valves adapted to open in response to fluid pressure in said seal to admit pressure to said clutch, fluid pressure operated means to open said check valves and permit flow of fluid from said clutch to said seal, a source of fluid pressure, conduit means for connecting said source to said brake, said seal and to said check valve opening means, valve means included in said conduit means to admit pressure fluid to said check valve opening means and to release pressure from said seal and thereafter to admit pressure to the brake and to also relieve pressure from said brake, to relieve pressure from said check valve opening means and thereafter supply pressure to said clutch by way of said seal and check valves, said valve means including control valves, operating linkage for said control valves, a master control lever movable between neutral and forward and reverse drive controlling positions for operating said linkage to control release of pressure from said brake and application of pressure to said clutch and to control release of pressure from said clutch and application of pressure to said brake, said valve means also including a clutch interlock pressure valve operable to permit pressure application to said clutch upon relief of pressure from said brake and a brake interlock pressure valve operable to permit pressure application to said brake upon relief of pressure from said clutch, said valve means also including a pressure valve automatically operable to control said brake interlock valve and said pressure operated check valve opening means.

11. A control system for a reversing gear having a fluid pressure operated clutch for causing forward drive, a fluid pressure operated brake for causing reverse drive, a rotary pressure seal associated with said clutch, check valves within said seal, said check valves adapted to open in response to fluid pressure in said seal to admit pressure to said clutch, fluid pressure operated means to open said check valves and permit flow of fluid from said clutch to said seal, a source of fluid pressure, conduit means for connecting said source to said brake, said seal and to said check valve opening means, valve means included in said conduit means to admit pressure fluid to said check valve opening means and to release pressure from said seal and thereafter to admit pressure to the brake and to also relieve pressure from said brake, to relieve pressure from said check valve opening means and thereafter supply pressure to said clutch by way of said seal and check valves, said valve means including control valves, operating linkage for said control valves, a master control lever movable between neutral and forward and reverse drive controlling positions for operating said linkage to control release of pressure from said brake and application of pressure to said clutch and to control release of pressure from said clutch and application of pressure to said brake, said valve means also including a clutch interlock pressure valve operable to permit pressure application to said clutch upon relief of pressure from said brake and a brake interlock pressure valve operable to permit pressure application to said brake upon relief of pressure from said clutch, said valve means also including a pressure valve automatically operable to control said brake interlock valve and said pressure operated check valve opening means, one of said control valves being associated with said pressure operated valve and being operable through said linkage upon movement of said control lever from the forward to the reverse drive controlling position to successively cause release of pressure from said clutch and application of pressure to said brake.

12. A control system for a reversing gear having a fluid pressure operated clutch for causing forward drive, a fluid pressure operated brake for causing reverse drive, a rotary pressure seal associated with said clutch, check valves within said seal, said check valves adapted to open in response to fluid pressure in said seal to admit pressure to said clutch, fluid pressure operated means to open said check valves and permit flow of fluid from said clutch to said seal, a source of fluid pressure, conduit means for connecting said source to said brake, said seal and to said check valve opening means, valve means included in said conduit means to admit pressure fluid to said check valve opening means and to release pressure from said seal and thereafter to admit pressure to the brake and to also relieve pressure from said brake, to relieve pressure from said check valve opening means and thereafter supply pressure to said clutch by way of said seal and check valves, said valve means including control valves, operating linkage for said control valves, a master control lever movable between neutral and forward and reverse drive controlling positions for operating said linkage to control release of pressure from said brake and application of pressure to said clutch and to control release of pressure from said clutch and application of pressure to said brake, said valve means also including a clutch interlock pressure valve operable to permit pressure application to said clutch upon relief of pressure from said brake and a brake interlock pressure valve operable to permit pressure application to said brake upon relief of pressure from said clutch, said valve means also including a pressure valve automatically operable to control said brake interlock valve and said pressure operated check valve opening means, one of said control valves being associated with said pressure operated valve and being operable through said linkage upon movement of said control lever from the forward to the reverse drive controlling position to successively cause release of pressure from said clutch and application of pressure to said brake, said valve means including also a second pressure valve having a member movable normally to a position to open and vent said clutch seal but movable under the influence of clutch applying pressure to close and permit pressure to be applied to said clutch through said seal and check valves therein.

13. A control system for a reversing gear having a fluid pressure operated clutch for causing forward drive, a fluid pressure operated brake for causing reverse drive, a rotary pressure seal associated with said clutch, check valves within said seal, said check valves adapted to open in response to fluid pressure in said seal to admit pressure to said clutch, fluid pressure operated means to open said check valves and permit flow of fluid from said clutch to said seal, a source of fluid pressure, conduit means for connecting said source to said brake, said seal and to said check valve opening means, valve means included in said conduit means to admit pressure fluid to said check valve opening means and to release pressure from said seal and thereafter to admit pressure to the brake and to also relieve pressure from said brake, to relieve pressure from said check valve opening means and thereafter supply pressure to said clutch by way of said seal and check valves, said valve means including control valves, operating linkage for said control valves, a master control lever movable between neutral and forward and reverse drive controlling positions for operating said linkage to control release of pressure from said brake and application of pressure to said clutch and to control release of pressure from said clutch and application of pressure to said brake, said valve means also including a clutch interlock pressure valve operable to permit pressure application to said clutch upon relief of pressure from said brake and a brake interlock pressure valve operable to permit pressure application to said brake upon relief of pressure from said clutch, said valve means also including a pressure valve automatically operable to control said brake interlock valve and said pressure operated check valve opening means, one of said control valves being associated with said pressure operated valve and being operable through said linkage upon movement of said control lever from the forward to the reverse drive controlling position to successively cause release of pressure from said clutch and application of pressure to said brake, said valve means including also a second pressure valve having a member movable normally to a position to open and vent said clutch seal but movable under the influence of clutch applying pressure to close and permit pressure to be applied to said clutch through said seal and check valves therein, said second pressure valve having a pressure element attached to said movable member, means for delaying pressure equalization on opposite sides of said element to delay movement of said member from the closed to the open position to control time of pressure application of said clutch through said clutch seal and thereafter venting said seal.

14. A control system for a reversing gear having a fluid pressure operated clutch for causing forward drive, a fluid pressure operated brake for causing reverse drive, a rotary pressure seal associated with said clutch, check valves within said seal, said check valves adapted to open in response to fluid pressure in said seal to admit pressure to said clutch, fluid pressure operated means to open said check valves and permit flow of fluid from said clutch to said seal, a source of fluid pressure, conduit means for connecting said source to said brake, said seal and to said check valve opening means, valve means included in said conduit means to admit pressure fluid to said check valve opening means and to release pressure from said seal and thereafter to admit pressure to the brake and to also relieve pressure from said brake, to relieve pressure from said check valve opening means and thereafter supply pressure to said clutch by way of said seal and check valves, said valve means including control valves, operating linkage for said control valves, a master control lever movable between neutral and forward and reverse drive controlling positions for operating said linkage to control release of pressure from said brake and application of pressure to said clutch and to control release of pressure from said clutch and application of pressure to said brake, said valve means also including a clutch interlock pressure valve operable to permit pressure application to said clutch upon relief of pressure from said brake and a brake interlock pressure valve operable to permit pressure application to said brake upon relief of pressure from said clutch, said valve means also including a pressure valve automatically operable to control said brake interlock valve and said pressure operated check valve opening means, one of said control valves being associated with said pressure operated valve and being operable through said linkage upon movement of said control lever from the forward to the reverse drive controlling position to successively cause release of pressure from said clutch and application of pressure to said brake, said valve means including also a second pressure valve having a member movable normally to a position to open and vent said clutch seal but movable under the influence of clutch applying pressure to close and permit pressure to be applied to said clutch through said seal and check valves therein, and a separate manually operable valve for recharging said clutch, said recharging valve associated with said second valve to decrease the pressure on one side of said member therein.

15. A control system for a prime mover having speed controlling means and a reversing gear driven thereby and having separate pressure distensible means for causing drive in either direction, said control system comprising pressure controlling and pressure responsive means connected to said pressure distensible means, said pressure controlling means being operable separately and in preselected sequential combination to cause operation of said pressure responsive means thereby to cause separate application and relief of pressure on said separate pressure distensible means to obtain forward or reverse drive through said reversing gear, a manually operable speed and reversing control lever for operating said prime mover speed controlling means and said pressure controlling means, and means associated with said lever to retard movement thereof at spaced slow speed reversing control positions to insure proper operation of said pressure responsive means upon variation in pressure caused by movement of said pressure controlling means by said lever.

16. A control system for a prime mover having speed controlling means and reversing gear driven thereby and having a pressure operated clutch for causing drive in one direction, a pressure operated brake for causing drive in a reverse direction and a rotary seal for said clutch including check valves permitting operation of said clutch and pressure operated check valve opening means for discontinuing operation of said clutch, said control system comprising pressure control connections for said rotary clutch seal and said brake, said pressure connections including pressure operated control means for preventing application of pressure to said clutch seal until the pressure is relieved on said brake and for preventing application of pressure to said brake until pressure is relieved from said clutch seal, pressure operated control means for controlling the flow of pressure to and for controlling relief of pressure from said clutch seal and said pressure operated check valve operating means, control means operable in sequence and combination for controlling application and relief of pressure to said pressure connections and said pressure operated control means to cause sequential operation of said clutch and said brake, and a manually operable master control lever movable to forward and reverse low and high speed controlling positions operatively connected to said prime mover speed controlling means and for operating said pressure application and relief controlling means when said lever is moved away from the neutral position.

17. A control system for a prime mover having speed controlling means and a reversing gear driven thereby and having a pressure operated clutch for causing drive in one direction, a pressure operated brake for causing drive in the reverse direction and a rotary seal associated with said clutch and including check valves permitting application of pressure to said clutch and pressure operated means for unseating said check valves to permit relief of pressure from said clutch, said control means comprising pressure control connections for said clutch seal and said brake, said connections including pressure operated means to prevent application of pressure to said clutch seal until pressure is relieved from said brake and to prevent application of pressure to said brake until pressure is relieved from said clutch seal, and means for controlling application and relief of pressure in said pressure connections to cause sequential operation of said clutch and brake, said pressure application and relief controlling means comprising pressure responsive means for controlling the rate of pressure application and relief of pressure to said clutch, clutch seal and said pressure operated check valve unseating means in said seal, application and relief valves operable separately and in combination for controlling said pressure operated means and said pressure responsive means to cause forward or reverse drive, and a manually operable master control lever for operating said prime mover speed controlling means and said application and relief valves.

18. A control apparatus for controlling two fluid pressure operated clutch means adapted to be rendered effective by fluid at or exceeding a chosen pressure and ineffective when the pressure of said fluid is less than said chosen pressure, said apparatus comprising an operator's control device operable to supply fluid under pressure to effect operation of either one of said clutch means, and interlock means operable automatically to positively prevent the supplying of fluid under pressure to either clutch means with the pressure of fluid in the other clutch means exceeding said chosen pressure.

19. A control apparatus for controlling two fluid pressure operated clutch means adapted to be rendered effective by fluid at or exceeding a chosen pressure and ineffective when the pressure of said fluid is less than said chosen pressure, said apparatus comprising an operator's control device operable to supply fluid under pressure to effect operation of either one of said clutch means, and means arranged to control the supply of fluid under pressure to each clutch means by operation of said operator's control device and operable automatically to positively prevent the supplying of fluid under pressure to either clutch means when the pressure of fluid in the other clutch means exceeds said chosen pressure.

20. A control apparatus for controlling two fluid pressure operated clutch means adapted to be rendered effective by fluid at or exceeding a chosen pressure and ineffective when the pressure of said fluid is less than said chosen pressure, said apparatus comprising an operator's control device operable to supply fluid under pressure to effect operation of either one of said clutch means, and also operable to exhaust fluid pressure from either of said clutch means, and interlock means arranged to control the supply of fluid under pressure to each clutch means, said interlock means including pressure actuated means operable when the pressure of controlling fluid exceeds said chosen degree to positively prevent supply of fluid to the respective clutch means, and operable upon a reduction in the pressure of said controlling fluid to below said chosen degree to permit supply of fluid under pressure to the respective clutch means.

21. Control mechanism for a pair of fluid actuators including valve means for controlling the supply of fluid pressure to each actuator, means including a control element for selectively operating said valve means to supply fluid pressure to either of said actuators, and means controlled by the pressure of fluid supplied to one of the actuators for preventing the supply of fluid pressure to the other actuator except when the pressure of fluid supplied to said one actuator is less than a predetermined value.

WILLIAM ELMER BRILL.
EMIL R. GASSER.

REFERENCES CITED

The following references are of record in the file of this patent:

UNITED STATES PATENTS

| Number | Name | Date |
|---|---|---|
| 2,326,911 | Aikman | Aug. 17, 1943 |
| 2,003,351 | Eells | June 4, 1935 |
| 1,938,338 | Jimerson | Dec. 5, 1933 |

FOREIGN PATENTS

| Number | Country | Date |
|---|---|---|
| 429,213 | Great Britain | May 27, 1935 |